United States Patent
Feng (10) Patent No.: US 7,511,866 B2
(45) Date of Patent: Mar. 31, 2009

(54) MULTIPLE RESOLUTION IMAGE SENSOR AND CONTROL METHOD THEREOF

(75) Inventor: Chang-Yung Feng, Taipei (TW)

(73) Assignee: Transpacific Plasma, LLC, Taipei (TW)

( * ) Notice: Subject to any disclaimer, the term of this patent is extended or adjusted under 35 U.S.C. 154(b) by 374 days.

(21) Appl. No.: 10/905,844

(22) Filed: Jan. 23, 2005

(65) Prior Publication Data

US 2006/0044630 A1 Mar. 2, 2006

(30) Foreign Application Priority Data

Sep. 2, 2004 (TW) .............................. 93126552 A (51) Int. Cl.
*H04N 1/46* (2006.01)

(52) U.S. Cl. ...................... 358/514; 358/482; 358/483; 358/505; 382/318; 348/98; 250/208.1

(58) Field of Classification Search ......... 358/505–514, 358/482–483, 520; 382/318–319, 312; 348/96–98, 348/246; 250/208.1; 356/222
See application file for complete search history.

(56) References Cited

U.S. PATENT DOCUMENTS

| | | | |
|---|---|---|---|
| 3,717,724 A * | 2/1973 | Montgomery, III | 348/272 |
| 5,262,631 A * | 11/1993 | Yamamoto et al. | 250/208.1 |
| 5,315,412 A * | 5/1994 | Mihara et al. | 358/512 |
| 5,519,514 A * | 5/1996 | TeWinkle | 358/514 |
| 6,005,689 A | 12/1999 | Miyasaka | |
| 6,396,596 B1 * | 5/2002 | Hosier et al. | 358/1.9 |
| 6,429,953 B1 * | 8/2002 | Feng | 358/520 |
| 2002/0175270 A1 * | 11/2002 | Boemler et al. | 250/208.1 |

FOREIGN PATENT DOCUMENTS

| | | |
|---|---|---|
| DE | 295 20 865 U1 | 7/1996 |
| DE | 198 35 348 A1 | 2/2000 |
| JP | 03099574 A | 4/1991 |
| JP | 2002-101805 | 4/2000 |

OTHER PUBLICATIONS

English Translation JP2000-101805.*

* cited by examiner

*Primary Examiner*—Twyler L Haskins
*Assistant Examiner*—Dennis Dicker
(74) *Attorney, Agent, or Firm*—Workman Nydegger (57) ABSTRACT

An image sensor includes a row of first color sensors including a plurality of first color sensors for sensing first color light to generate a plurality of first sub-pixels and a row of second color sensors including a plurality of second color sensors for sensing second color light to generate a plurality of second sub-pixels. The distance between a first end of an effective sensing area of each first color sensor and a first end of an effective sensing area of a corresponding second color sensor in the linear direction of the image sensor is a first length greater than zero.

27 Claims, 11 Drawing Sheets

MULTIPLE RESOLUTION IMAGE SENSOR AND CONTROL METHOD THEREOF

BACKGROUND OF INVENTION

1. Field of the Invention

The present invention relates a multiple resolution image sensor and control method, more particularly, a multiple resolution image sensor for utilizing an effective sensing area inter-leaving each color sensor and control method thereof.

2. Description of the Prior Art

A scanner is currently a very common peripheral product that is used for scanning documents and generating corresponding image data. Additionally, the scanner can provide functions such as using a phone line to transmit the image data to a fax machine, connecting to a network and transmitting the image data using electronic mail, or connecting to a printer to generate output.

Figure 1:
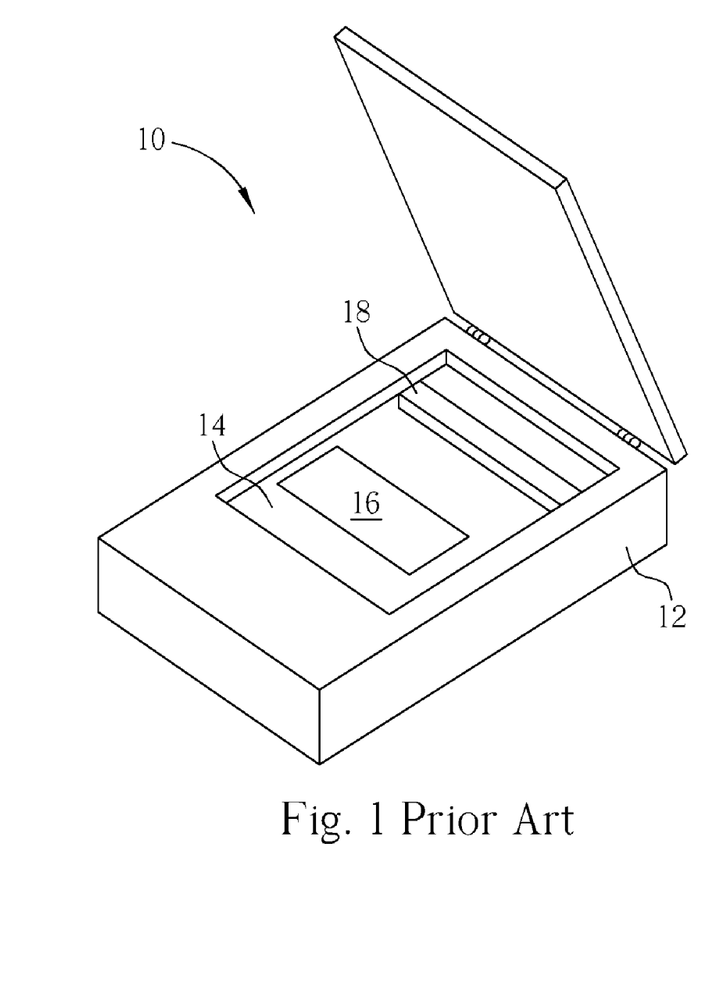
FIG. 1 illustrates a prior art diagram of a scanner.
Figure 2:
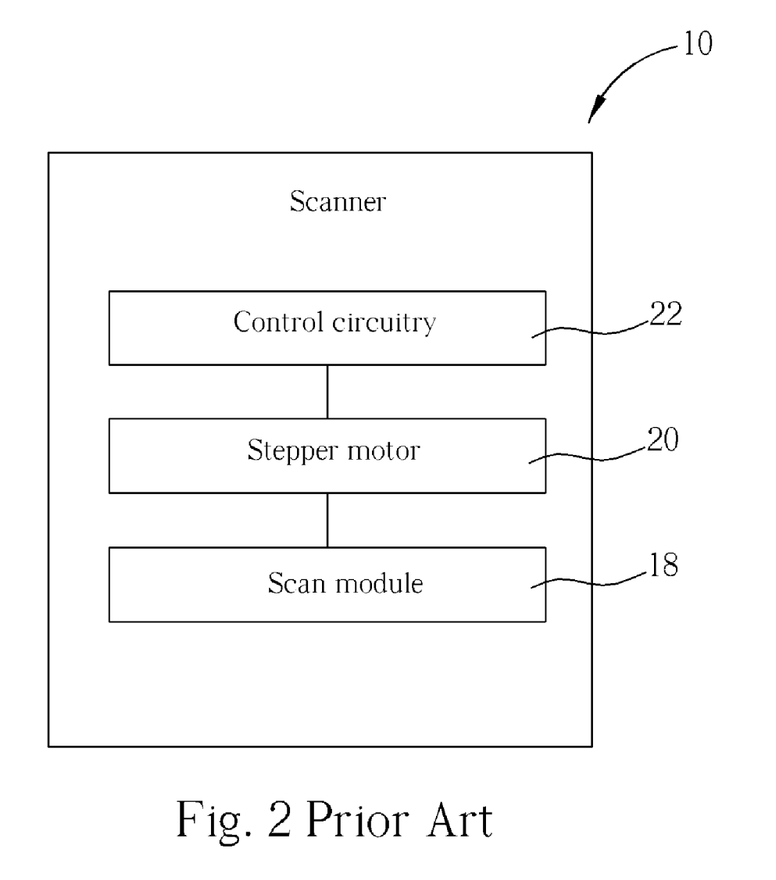
FIG. 2 illustrates a functional block diagram of a scanner 10.

Please refer to FIG. 1 and FIG. 2. FIG. 1 illustrates a prior art diagram of a scanner 10. FIG. 2 illustrates a functional block diagram of a scanner 10. The scanner 10 comprises a casing 12, a control circuitry 22 for controlling operation of the scanner 10, a scan module installed within the casing 12, a stepper motor installed within the casing 12 that is situated between and coupled to the control circuitry 22 and the scan module 18. As shown in FIG. 1, a platen 14 is placed on top of the casing 12 for scanning a document 16. When the scan module 18 is scanning the document 16, the control circuitry 22 controls the stepper motor 20 using a stepping method to drive the scan module 18 to scan a document 16 from the beginning to the end.

Figure 3:
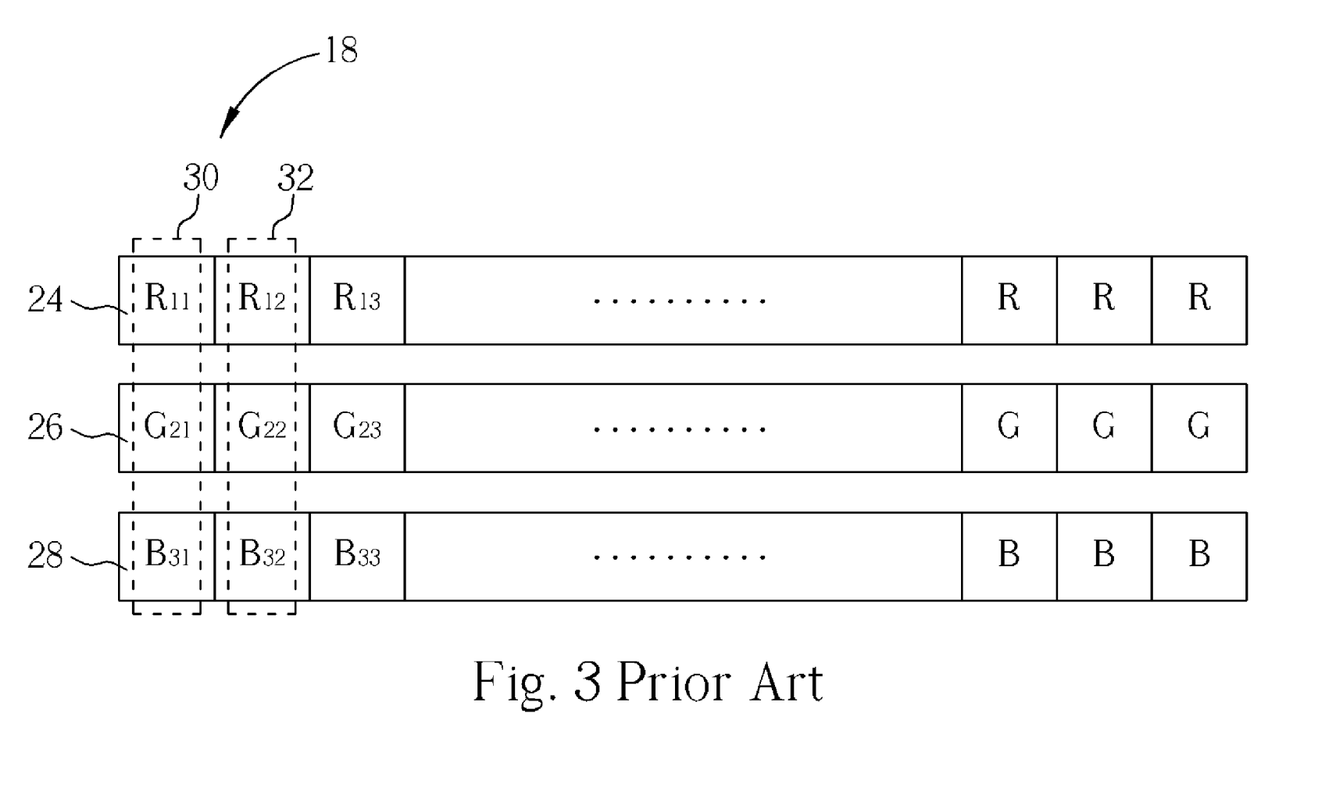
FIG. 3 illustrates a prior art diagram of a color sensor of a scan module.

Please refer to FIG. 3. FIG. 3 illustrates a prior art diagram of a color sensor of a scan module 18. The scan module 18 typically has three rows of color sensors; a first color sensor 24, a second color sensor 26 and a third color sensor 28. The first color sensor 24, the second color sensor 26, and the third color sensor 28 are red, green, and blue respectively. As the document 16 is scanned each color sensor senses the reflected red light, the reflected green light, and the reflected blue light. A single color sensor is capable of sensing a light signal of a single sub-pixel. Three different light signals, of normal light, combine to form a pixel. For example, sub-pixel R11 of the first color sensor 24, sub-pixel G21 of the second color sensor 26, and sub-pixel B31 of the third color sensor can combine to form the first pixel 30; sub-pixel R12, sub-pixel G22, and sub-pixel B31 can combine to form the second pixel 31, and so forth. Resolution of the scan module 18 is calculated by the number of pixels detected on unit area of the first color sensor 24, the second color sensor 26, and the third color sensor 28. For example, if the scanner 10 has a resolution of 600 dots per inch (dpi) and 1200 dpi, that means that the first color sensor 24, the second color sensor 26, and the third color sensor 28 of the scan module 18, each has 600 or 1200 sub-pixels per inch and all three sensors combine for a resolution of 600 or 1200 pixels per inch.

Figure 4:
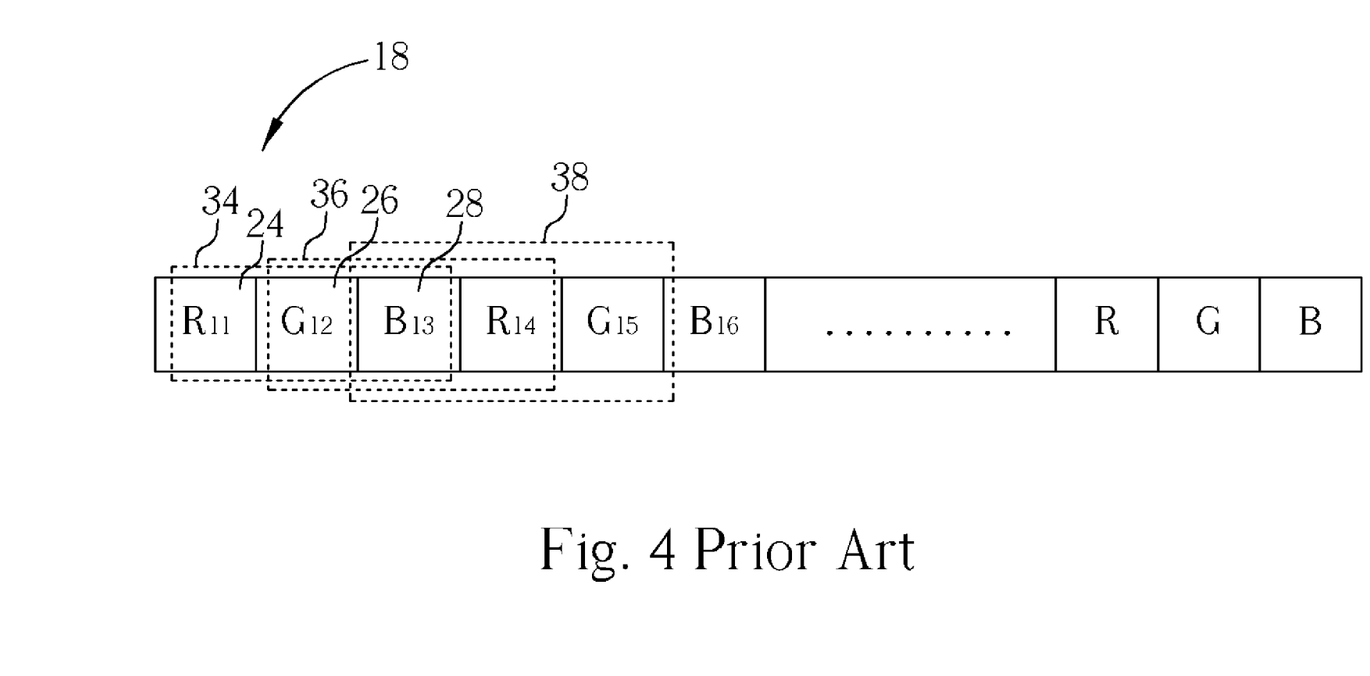
FIG. 4 illustrates another prior art diagram of a color sensor of a scan module.

Please refer to FIG. 4. FIG. 4 illustrates a prior art diagram of the color sensor of scan module 33. The scan module 33 comprises a row of color sensors formed by the inter-leaving of the first color sensor 24, the second color sensor 26, and the third color sensor 28. The sub-pixel R11 of the first color sensor 24, the sub-pixel G12 of the second color sensor, and the sub-pixel B13 of the third color sensor can combine to form the first pixel 34; sub-pixel G12, B13, and R14 can also combine to form a second pixel; sub-pixel B13, R14, and G15 can combine to form a third pixel 38, and so forth. In comparison with the prior art mentioned above, if the scanner has a resolution of 600 or 1200 sub-pixels per inch then utilizing the present invention capturing pixels the resolution should increase by three times its normal dpi. The present invention capturing pixels generates this resolution by repeating the inter-leaving, for example, 1800 dpi (600 dpi*3) and 3600 dpi (1200*3). Although this method of arrangement utilizes the same quantity of color sensors to achieve a higher density there is a need to inter-leave the first color sensor 24, the second color sensor 26, and the third color sensor 28. This inter-leaving process is difficult and costly.

SUMMARY OF INVENTION

This invention relates to a multiple resolution image sensor for utilizing an effective sensing area inter-leaving each color sensor and a control method to solve the above-mentioned problem.

One embodiment of the claimed invention is an image sensor comprising a row of first color sensors comprises a plurality of first color sensors for sensing first color light to generate a plurality of first color sub-pixels, and a row of second color sensors for sensing second color light to generate a plurality of second color pixels and the distance between a first end of an effective sensing area of each first color sensor and a first end of an effective area of a corresponding second color sensor in the linear direction of the image sensor is a first length greater than zero.

Another embodiment of the claimed invention is a method of scanning an image comprising the following steps: combining a sub-pixel generated by a first color sensor sensing a first color light, a first sub-pixel generated by a second color sensor sensing a second color light, and a first sub-pixel generated by a third color sensing a third color light to generate a first pixel; combining a sub-pixel generated by the first color sensor sensing the first color light, a second sub-pixel generated by the second color sensor sensing the second color light, and the first sub-pixel of the third color sensor sensing a third color light to generate a second pixel; combining the sub-pixel generated by the first color sensor sensing the first color light, the second sub-pixel generated by the second color sensor sensing the second color light, and a second sub-pixel generated by the third color sensor sensing the third color light to generate a third pixel.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
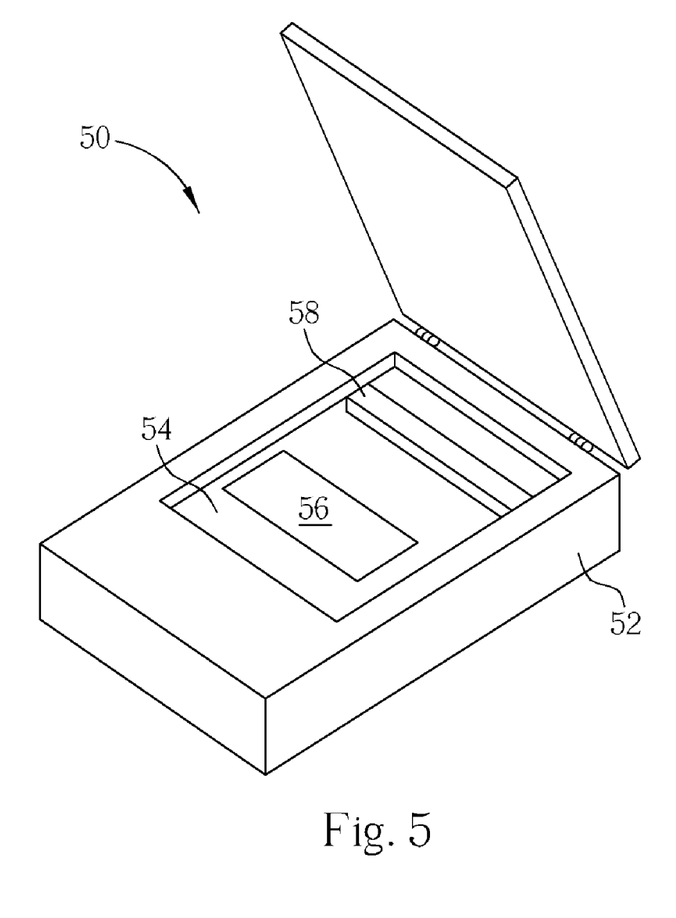
FIG. 5 illustrates a diagram of a scanner.
Figure 6:
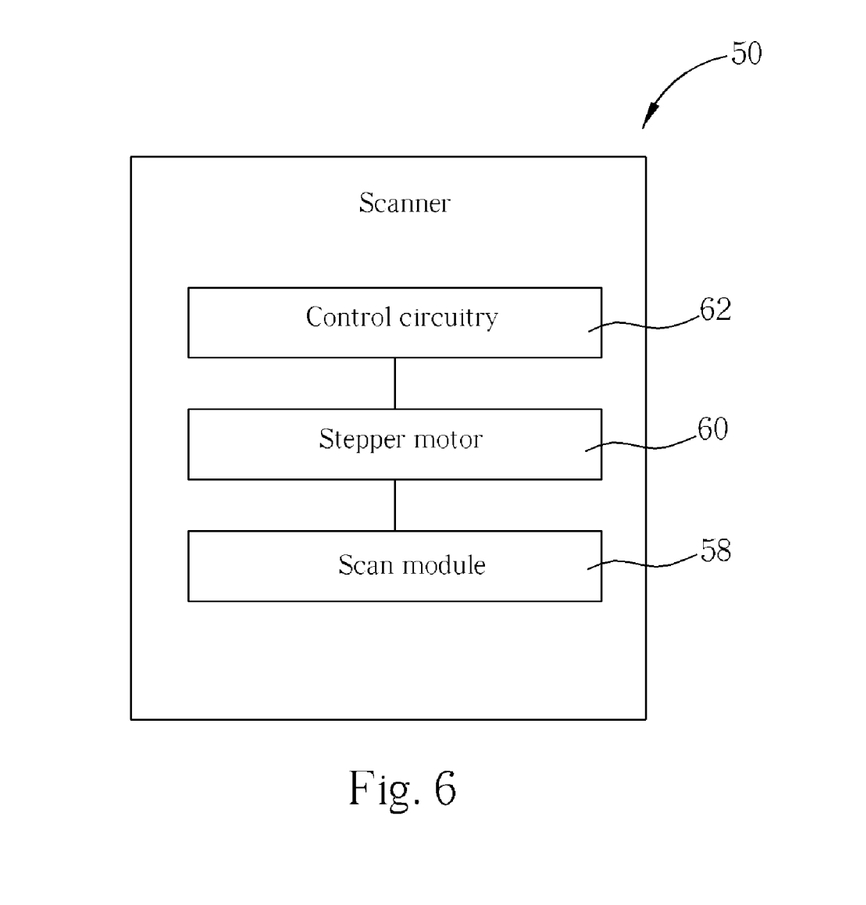
FIG. 6 illustrates a functional block diagram of a scanner.

Please refer to FIG. 5 and FIG. 6. FIG. 5 illustrates a diagram of a scanner 50. FIG. 6 illustrates a functional block diagram of a scanner 50 according to the claimed invention. The scanner 50 comprises a casing 52, a control circuit 62 for controlling operation of the scanner 50, a scan module 58 installed within the casing 52, and a stepper motor installed within the casing 52 that is situated in between and coupled to the control circuit 62 and the scan module 58. In FIG. 5, a platen 54 placed on top of the casing 52 for a document 56 to be placed on for scanning. When the scan module 18 is scanning the document 56, the control circuit 62 will control the stepper motor 60 using a stepping method to drive the scan module 18 to scan the document 16 from beginning to end.

Figure 7:
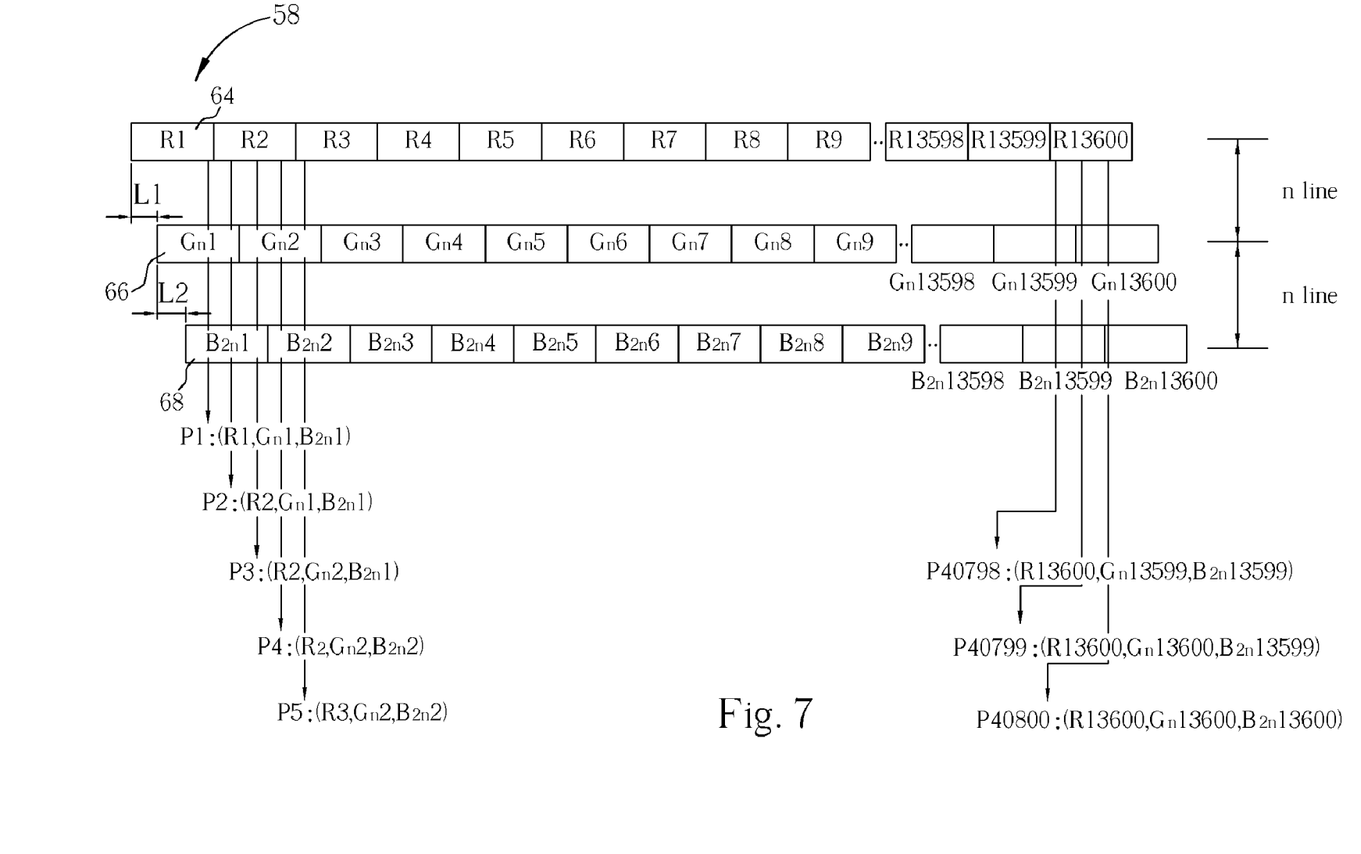
FIG. 7 illustrates a diagram of an image sensor of a scan module according to first embodiment of the present invention.

Please refer to FIG. 7. FIG. 7 illustrates a diagram of an image sensor of a scan module 58. The scan module 58 has three rows of color sensors, a row of first color sensor 64, a row of second color sensor 66, and a row of third color sensor 68. Each row is separated by a gap of n line. The row of first color sensors 64 comprises 13600 linear first light sensors, the row of second color sensors 66 comprises 13600 linear second color sensors, and the row of third color sensors 68 comprises 13600 linear third color sensors; the first color sensor 64 is a red color sensor, the second color sensor 66 is a green color sensor and the third color sensor 68 is a blue color sensor. Each sensor senses the document 16 scanned that reflects red light, green light, and blue light. A single color sensor is capable of sensing a light signal of a single sub-pixel, the first color sensor 64 is capable of sensing a first light to generate a first sub-pixel, the second color sensor 66 is capable of sensing a second light to generate a second sub-pixel, and the third color sensor 68 is capable of sensing a third light to generate a third sub-pixel, and the first sub-pixel, the second sub-pixel and the third sub-pixel can combine to form a pixel.

In first embodiment of the present invention, the length of each first color sensor 64 is identical to length of each second color sensor 66 and the length of each third color sensor 68. The effective sensing area is the part of the sensing area of the first color sensor 64, the second color sensor 66, and the third color sensor 68. Also, the distance between a first end of each first color sensor 64 and a first end of a corresponding second color sensor 66 in the linear direction of the image sensor is a first length L1 greater than zero, the distance between a first end of each second color sensor 66 and a first end of a corresponding third color sensor 68 in the linear direction of the image sensor is a second length L2 greater than zero. The first length L1 can either be not equal to the second length L2 or equal to the second length L2. The first length L1 and the second length L2 are one third of the length of the image sensor, which means that the distance between a first end of each first color sensor 64 and a first end of a corresponding second color sensor 66 in the linear direction of the image sensor is one third of the length of the image sensor and the distance between a first end of each second color sensor 66 and a first end of a corresponding third color sensor 68 in the linear direction of the image sensor is one third of the length of the image sensor.

Figure 8:
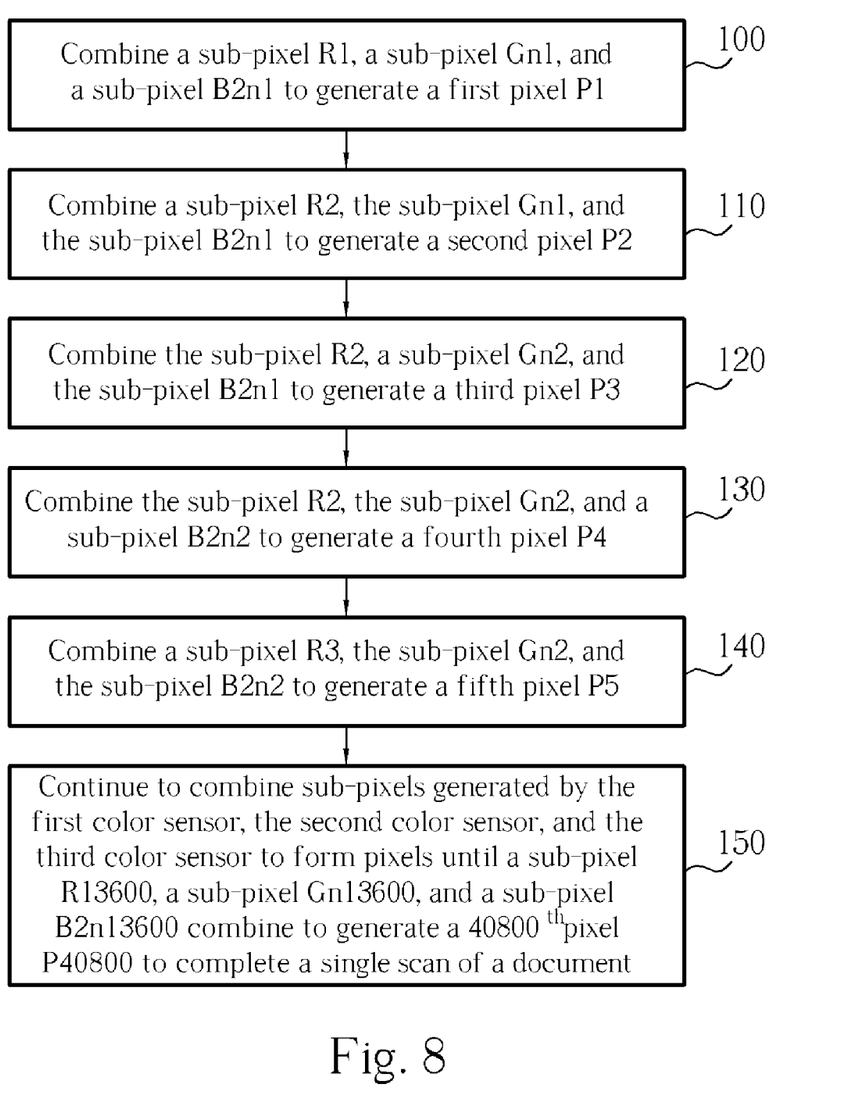
FIG. 8 illustrates a flow chart of a scan module performing an image scan according to the first embodiment of the present invention.

Please refer to FIG. 7 and FIG. 8. FIG. 8 illustrates a flow chart of scan module 58 performing an image scan utilizing the method comprising the following steps:

Step 100: combine a sub-pixel R1 generated by a first color sensor 64, a sub-pixel Gn1 generated by a second color sensor 66, and a sub-pixel B2n1 generated by a third color sensor 68 to generate a first pixel P1.

Step 110: combine a sub-pixel R2 generated by the first color sensor 64, the sub-pixel Gn1 generated by the second color sensor 66, and the sub-pixel B2n1 generated by the third color sensor 68 to generate a second pixel P2.

Step 120: combine the sub-pixel R2 generated by the first color sensor 64, a sub-pixel Gn2 generated by the second color sensor 66, and the sub-pixel B2n1 generated by the third color sensor 68 to generate a third pixel P3.

Step 130: combine the sub-pixel R2 generated by the first color sensor 64, the sub-pixel Gn2 generated by the second color sensor 66, and the sub-pixel B2n2 generated by the third color sensor 68 to generate a fourth pixel P4.

Step 140: combine the sub-pixel R3 generated by the first color sensor 64, the sub-pixel Gn2 generated by the second color sensor 66, and the sub-pixel B2n2 generated by the third color sensor 68 to generate a fifth pixel P5.

Step 150: continue to combine sub-pixels generated by the first color sensor 64, the second color sensor 66, and the third color sensor 68 to form pixels until a sub-pixel R13600 generated by the first color sensor 64, a sub-pixel Gn13600 generated by the second color sensor 66, and a sub-pixel B2n13600 generated by the third color sensor 68 combine to generate a $40800^{th}$ pixel P40800 to complete a single scan of the document 56.

In FIG. 7, there is a dislocation arrangement of the row of first color sensors 64, the row of second color sensors 66, and the row of third color sensors 68 resulting in a situation where a portion of pointer direction (the direction of the scan module 58 scanning the document 56) will be overlapping the corresponding pointers. Each first color sensor, second color sensor, and third color sensor of the prior art scan module has a side-by-side arrangement. The first color sensor in the direction of scanning a document corresponds with the second color sensor and the third color sensor. The color sensor of the present invention in the direction of scanning a document 56 forms an overlapping portion, a sub-pixel generated by each color sensor can be repeatedly utilized by different pixels, hence the sensor of the present invention utilizes relative positioning and not a one-to-one corresponding arrangement.

In the above-mentioned, different pixels can repeatedly utilize a single sub-pixel approximately three times. When the stepper motor 60 brings the scan module 58 to complete a single pass, the sensor of the scan module 58 generates a total of 40800 pixels, if the single sub-pixel is only captured once, 13600 pixels are generated. In comparison with the number of pixels in the scan module 58 and the prior art scan module, the present invention is three times the resolution of the prior art scan module. In the gray level aspect, the gray level is formed by the color signals of a group of sub-pixels that is averaged and totaled generating a gray level resolution that is also three times the resolution of the prior art scan module.

Figure 9:
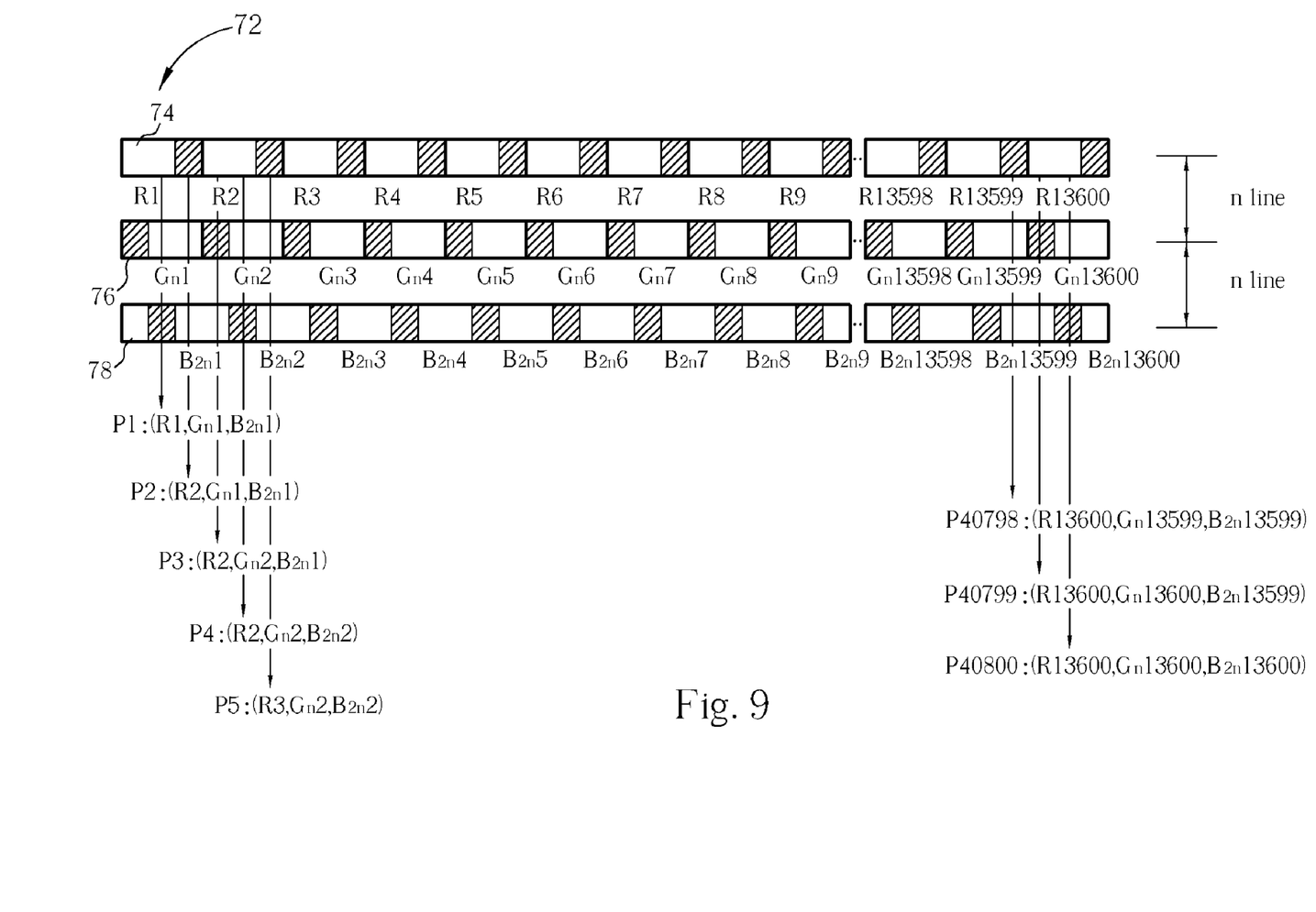
FIG. 9 illustrates a diagram of color sensors of a scan module according to second embodiment of the present invention.

Please refer to FIG. 9. FIG. 9 illustrates a diagram of color sensors of a scan module 72 according to second embodiment. The scan module 72 comprises three rows of color sensors, a row of first color sensors 74, a row of second color sensors 76, and a row of third color sensors 78 respectively. Each row is separated by a gap of n line. The row of first color sensors 74 comprises 13600 linear first color sensors 74, the row of second color sensors 76 comprises 13600 linear second color sensors 76 and the row of third color sensors 78 comprises 13600 linear third color sensors 78; the first color sensor 74 is a red color sensor, the second color sensor 76 is a green color sensor, and the third color sensor 78 is a blue color sensor. Each sensor senses the document 16 scanned which reflects red light, green light and blue light.

In the second embodiment of the present invention, the length of each first color sensor 74 is identical to the length of each second color sensor 76 and the length of each third color sensor 78. The second embodiment differs from the first embodiment in that the effective area of each first color sensor, second color sensor, and third color sensor does not cover the sensor area completely, each first color sensor, second color sensor, and third color sensor comprise an effective sensing area (white area of the color sensor in FIG. 9) and an ineffective sensing area (diagonal line of the color sensor in FIG. 9), and in which the ineffective sensing area of the color sensor is formed either by utilizing a photomask cover on the surface area of the color sensor or by black spots on the surface area of the color sensor. Each effective sensing area of the color sensor occupies two thirds of the surface area of the color sensor, whereas each ineffective sensing area occupies one third of the surface area of the color sensor. Each effective sensing area of the color sensor in the direction of scanning is not placed in an opposite position; therefore the method of dislocation arrangement is used.

Figure 10:
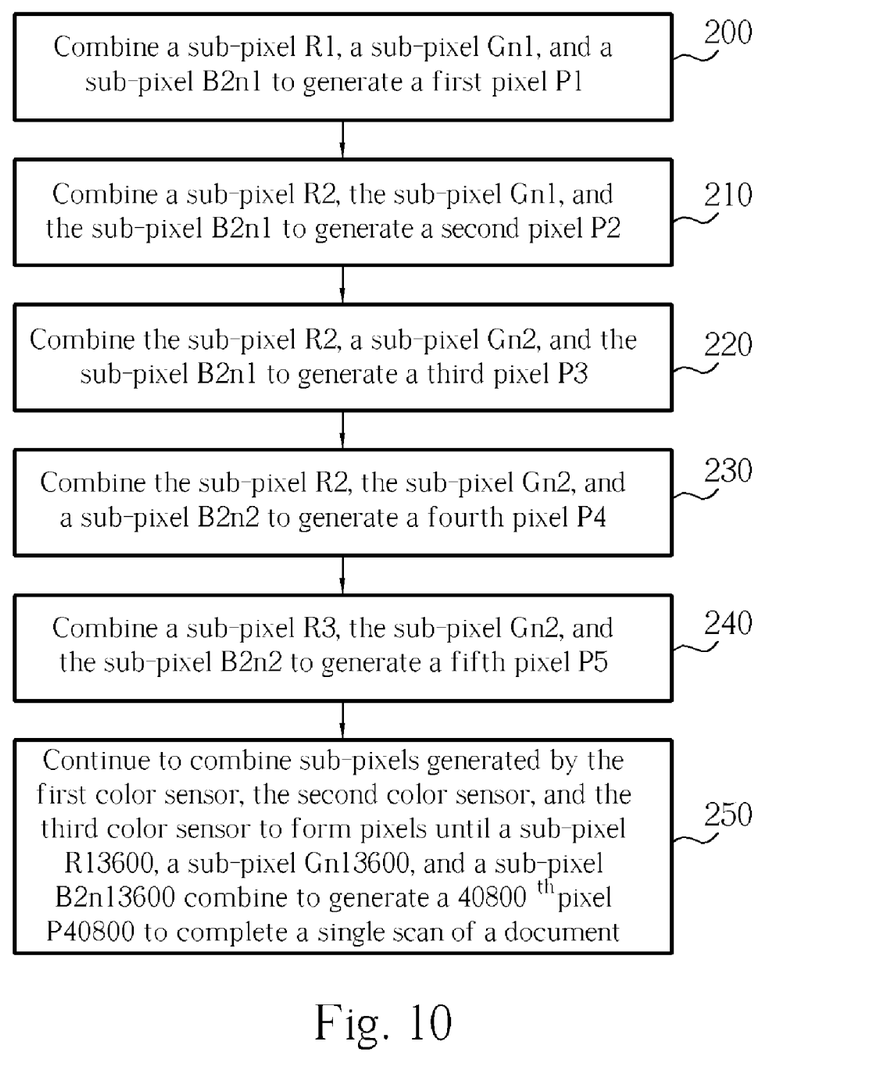
FIG. 10 illustrates a flow chart of the second embodiment of the present invention utilizing the scan module to perform an image scan.

The second embodiment of the present invention utilizes a method similar to the first embodiment whereby sub-pixels are combined by a scan module 72 of an image sensor to generate a pixel. Please refer to FIG. 9 and FIG. 10. FIG. 10 illustrates a flow chart of the second embodiment utilizing the scan module 72 to perform an image scan, this method comprising the following steps:

Step 200: combining the sub-pixel R1 generated by a first color sensor 74, a sub-pixel Gn1 generated by a second color sensor 76, and a sub-pixel B2n1 generated by a third color sensor to generate a first pixel P1.

Step 210: combining a sub-pixel R2 generated by the first color sensor 74, the sub-pixel Gn1 generated by the second color sensor 76, and the sub-pixel B2n1 generated by a third color sensor to generate a second pixel P2.

Step 220: combining the sub-pixel R2 generated by the first color sensor 74, a sub-pixel Gn2 generated by the second color sensor 76, and the sub-pixel B2n1 generated by a third color sensor to generate a third pixel P3.

Step 230: combining the sub-pixel R2 generated by the first color sensor 74, the sub-pixel Gn2 generated by the second color sensor 76, and a sub-pixel B2n2 generated by a third color sensor to generate a fourth pixel P4.

Step 240: combining a sub-pixel R3 generated by the first color sensor 74, the sub-pixel Gn2 generated by the second color sensor 76 and the sub-pixel B2n2 generated by a third color sensor to generate a fifth pixel P5.

Step 250: continue to combine sub-pixels generated by the first color sensor 74, the second color sensor 76, and a third color sensor to form pixels until a sub-pixel R13600 is generated by the first color sensor 74, a sub-pixel Gn13600 is generated by the second color sensor 76, and a sub-pixel B2n13600 is generated by the third color sensor that then combine to generate a 40800$^{th}$ pixel P40800 to complete a single scan of the document 56.

In FIG. 10, we can see that from the dislocation arrangement of the effective sensing area of the first color sensor 74, the second color sensor 76, and the third color sensor 78, a situation where a portion of the pointer direction (the direction of the scan module 72 scanning the document 56) overlaps the corresponding pointer, similar to the first embodiment, a sub-pixel generated by a single color sensor can be repeatedly captured, different pixels are able to use the same sub-pixel. Please be aware that if a captured position of the sub-pixel of the pixel is positioned at the ineffective sensing area then sub-pixel data of the ineffective sensing area at the said position can use sub-pixel data generated by effective sensing area of a neighbor sensor. For example, the position of the first pixel P1 corresponding to the sub-pixels R1, Gn1, and the ineffective sensing area of the third color sensor 78, third color data of the first pixel P1 can use the sub-pixel B2n1 generated by the neighbor third color sensor 78; and the position of the second pixel P2 corresponding to the ineffective sensing area of the first color sensor 78, the sub-pixel Gn1, the sub-pixel B2n1, the first color data of the second pixel P2 can use the sub-pixel R2 generated by the neighbor first color sensor 78. Similar to the first embodiment, a single sub-pixel can be repeatedly utilized by different pixels approximately three times. When the stepper motor 60 brings the scan module 72 to complete a single pass, the sensor of the scan module 72 generates a total of 40800 pixels. In comparison with the number of pixels in the scan module 58 and the prior art scan module, the present invention is three times the resolution of the prior art scan module. In the gray level aspect, the gray level is formed by the color signals of a group of sub-pixels that is averaged and totaled generating a gray level resolution that is also three times the resolution of the prior art scan module.

Figure 11:
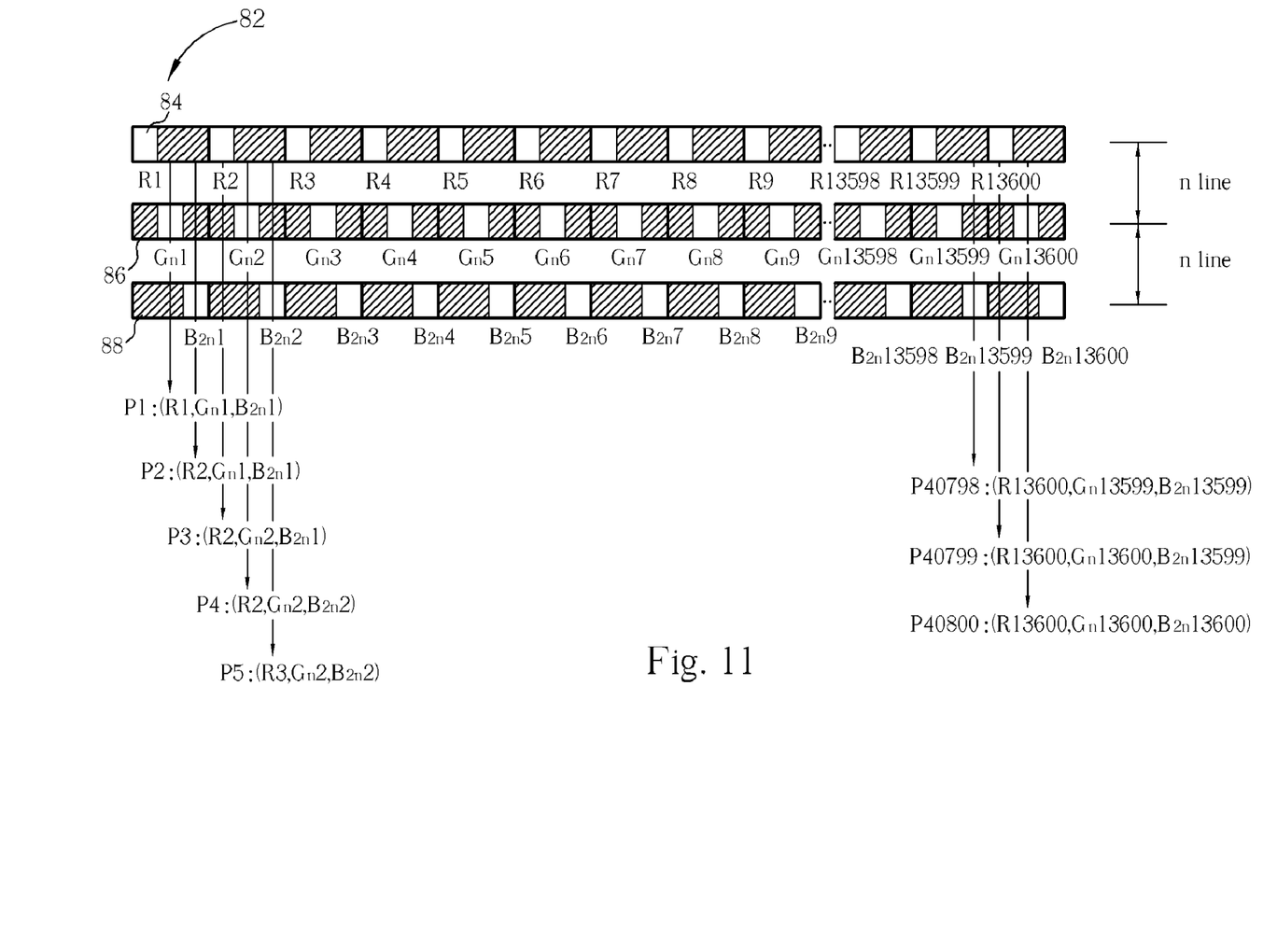
FIG. 11 illustrates a diagram of a scan module of an image sensor according to third embodiment of the present invention.

Please refer to FIG. 11. FIG. 11 illustrates a diagram of a scan module 82 of an image sensor according to a third embodiment of the present invention. The scan module 82 comprises three rows of color sensors: a row of first color sensors 84, a row of second color sensors 86, and a row of third color sensors 88; the first color sensor 84 is a red color sensor, the second color sensor 86 is a green color sensor, and the third color sensor 88, is a blue color sensor. Each row is separated by a gap of n line. The row of first color sensors 84 comprises 13600 linear first color sensors 84, the row of second color sensors 86 comprises 13600 linear second color sensors 86, and the row of third color sensors 88 comprises 13600 linear third color sensors 88; the first color sensor 84 is a red color sensor, the second color sensor 86 is a green color sensor, and the third color sensor 88 is a blue color sensor. As the document 16 is scanned each color sensor senses the reflected red light, reflected green light, and the reflected blue light.

In the third embodiment, the difference from the second embodiment is that the effective sensing area of each first color sensor 84, second color sensor 86, and third color sensor 88 (white portion of the image sensor in FIG. 11) occupies one third of the surface area of the color sensor, and ineffective sensing area (diagonal line of the color sensor in FIG. 11) occupies two thirds of the surface area of the color sensor. The ineffective area of the color sensor is formed by utilizing a photomask cover on the surface area of the color sensor, or is formed by black spots on the surface area of the color sensor. The theory of capturing the image is identical to that of the second embodiment, hence it will not be further mentioned. Similar to the second embodiment, a single sub-pixel of the third embodiment can be repeatedly utilized by different pixels approximately three times. When the stepper motor 60 brings the scan module 82 to complete a single pass, the sensor of the scan module 82 generates a total of 40800 pixels. In comparison with the number of pixels in the scan module 82 and the prior art scan module, the present invention generates three times the resolution of the prior art scan module.

In the gray level aspect, the gray level is formed by the color signal of a group of sub-pixels that is averaged and totaled generating a gray level resolution that is also three times the resolution of the prior art scan module.

In the above-mentioned, the second embodiment and the third embodiment utilize the dislocation arrangement of the effective sensing area of the image sensor. Therefore, a sub-pixel generated by a single color sensor can be repeatedly captured then utilized by different pixels. The size of the effective sensing area can occupy other proportions of the surface area of the color sensor and is not limited to the above-mentioned embodiment of occupying two-thirds of the color sensor or occupying one-third of the color sensor.

In comparison with the prior art of a multiple resolution image sensor and control method, the present invention utilizes the method of an effective sensing area inter-leaving each color sensor causing the different color sensors, in the direction of scanning a document, to form an overlapping portion that is not a one-to-one corresponding arrangement. A sub-pixel generated by a color sensor can be repeatedly captured; different pixels are able to use the same sub-pixel while utilizing the same quantity of color sensors mentioned previously to achieve a higher density. The method of inter-leaving the effective sensing area of the color sensor according to the present invention does not require that different adjacent color sensor are inter-leaved on a row of sensors as is the case with the prior art, hence a particular production is not needed and cost will not be increased Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor, comprising:
   a row of first color sensors capable of sensing a first color light and of generating a plurality of first sub-pixels; and
   a row of second color sensors capable of sensing a second color light and of generating a plurality of second sub-pixels;
   a row of third color sensors capable of sensing a third color light and of generating a plurality of third sub pixels;
   wherein a position of the row of second color sensors is offset from a position of the row of first color sensors such that a distance between a first end of an effective sensing area of a first color sensor and a first end of an effective sensing area of a corresponding second color sensor in the linear direction of the image sensor is a first length greater than zero, and wherein a length of the first color sensor and a length of the second color sensor are the same;
   wherein a position of the row of third color sensors is offset from the position of the row of second color sensors such that the distance between a first end of an effective sensing area of each third color sensor and a first end of an effective sensing area of a corresponding second color sensor in the linear direction of the image sensor is a second length greater than zero;
   wherein each first color sensor of the first row of color sensors is coupled to three pixel outputs, each of the three pixel outputs coupled to a different combination of one of two second color sensors that overlap the first color sensor and one of two third color sensors that overlap the first color sensor; and
   wherein each second color sensor and third color sensor that are coupled to the same pixel output also overlap each other.

2. The image sensor of claim 1 wherein the first color sensor further comprises an ineffective sensing area.

3. The image sensor of claim 2 wherein the ineffective sensing area of the first color sensor utilizes a photomask cover on a surface area of the first color sensor.

4. The image sensor of claim 2 wherein the ineffective sensing area of the first color sensor comprises black spots on a surface area of the first color sensor.

5. The image sensor of claim 1 wherein the second color sensor further comprises an ineffective sensing area.

6. The image sensor of claim 5 wherein the ineffective sensing area of the second color sensor utilizes a photomask cover on a surface area of the second color sensor.

7. The image sensor of claim 5 wherein the ineffective sensing area of the second color sensor comprises black spots on a surface area of the second color sensor.

8. The image sensor of claim 1 wherein a length of the first color sensor and the second color sensor are the same as a length of the third color sensor.

9. The image sensor of claim 1 wherein the third color sensor further comprises an ineffective sensing area.

10. The image sensor of claim 9 wherein the ineffective sensing area of the third color sensor utilizes a photomask cover on a surface area of the third color sensor.

11. The image sensor of claim 9 wherein the ineffective sensing area of the third color sensor comprises black spots on a surface area of the third color sensor.

12. The image sensor of claim 1 wherein the first color sensor comprises a red light sensor.

13. The image sensor of claim 1 wherein the second color sensor comprises a green light sensor.

14. The image sensor of claim 1 wherein the third color sensor comprises a blue light sensor.

15. A method of scanning an image comprising:
   combining a sub-pixel generated by a first color sensor in a row of first color sensors sensing a first color light and a first sub-pixel generated by a second color sensor in a row of second color sensors sensing a second color light and a first sub-pixel generated by a third color sensor in a row of third color sensors sensing a third color light to generate a first pixel;
   combining the sub-pixel generated by the first color sensor sensing the first color light and a second sub-pixel generated by the second color sensor sensing the second color light and the first sub-pixel generated by a third color sensor sensing the third color light to generate a second pixel;
   combining the sub-pixel generated by a first color sensor sensing the first color light and a second sub-pixel generated by the second color sensor sensing the second color light and a second sub-pixel generated by the third color sensor sensing the third color light to generate a third pixel,
   wherein a position of the second color sensor is offset from a position of the first color sensor such that a distance between a first end of an effective sensing area of the first color sensor and a first end of an effective of a corresponding second color sensor in a linear direction of an image sensor comprising the rows of first, second, and third color sensors is a first length greater than zero.

16. The method of claim 15 wherein a position of the third color sensor is offset from the position of the second color sensor such that a distance between a first end of an effective sensing area of the third color sensor and a first end of an effective sensing area of a corresponding second color sensor in the linear direction of the image sensor is a second length greater than zero.

17. The method of claim 15 wherein the sub-pixel generated by the first color sensor sensing the first color light comprises a red sub-pixel.

18. The method of claim 15 wherein the sub-pixel generated by the second color sensor sensing the second color light comprises a green sub-pixel.

19. The method of claim 15 wherein the sub-pixel generated by the third color sensor sensing the second color light comprises a blue sub-pixel.

20. A scanner, comprising:
a scan module comprising an image sensor, including:
   a row of first color sensors capable of sensing a first color light and of generating a plurality of first sub-pixels;
   a row of second color sensors capable of sensing a second color light and of generating a plurality of second sub-pixels, the row of second color sensors being lined up side-by-side with the row of first color sensors; and
   a row of third color sensors capable of sensing a third color light and of generating a plurality of third sub-pixels, the row of third color sensors being side-by side with the row of second color sensors and offset therefrom;
wherein a distance between a first end of an effective sensing area of each first color sensor and a first end of an effective sensing area of a corresponding second color sensor in the linear direction of the image sensor is a first length, and a portion of an ineffective sensing area of one color sensor is side-by-side with a portion of an effective sensing area of another color sensor;
wherein a position of the row of third color sensors is offset from the position of the row of second color sensors such that the distance between a first end of an effective sensing area of each third color sensor and a first end of an effective sensing area of a corresponding second color sensor in the linear direction of the image sensor is a second length; and
wherein the scan module comprises means for generating a plurality of pixels, the individual pixels comprising a first output sub-pixel generated by a first color sensor of the row of first color sensors, a second output sub-pixel generated by one of two second color sensors of the row of second color sensors closest to the first color sensor that generated the first output sub-pixel, a third output sub-pixel generated by one of two third color sensors of the row of third color sensors closest to the first color sensor that generated the first output sub-pixel and that is one of two third color sensors of the row of third color sensors closest to the second color pixel that generated the second output sub-pixel.

21. The scanner of claim 20, further comprising:
a control circuit capable of driving the scan module.

22. A scanner, comprising:
a scan module comprising an image sensor, including:
   a row of first color sensors capable of sensing a first color light and of generating a plurality of first sub-pixels; and
   a row of second color sensors capable of sensing a second color light and of generating a plurality of second sub-pixels, the row of second color sensors being lined up side-by-side with the row of first color sensors;
wherein the scanning module is configured to combine each of the plurality of first sub-pixels with two second sub-pixels generated by two of the second color sensors closest to a first color sensor that generated the first sub-pixel to form at least two pixels, and
wherein a position of each of the first sub-pixels is offset from the corresponding second sub-pixel such that a distance between a first end of an effective sensing area of each first color sensor and a first end of an effective sensing area of a corresponding second color sensor in the linear direction of the image sensor is a first length, and a portion of an ineffective sensing area of one color sensor is positioned side-by-side with a portion of an effective sensing area of another color sensor.

23. The scanner of claim 22, wherein the image sensor of the scan module further comprises a row of third color sensors capable of sensing a third color light and of generating a plurality of third sub-pixels;
wherein the scanning module is configured to combine each of the plurality of third sub-pixels is combinable with two first sub-pixels generated by two of the first color sensors closest to a third color sensor that generated the third sub-pixel and two second sub-pixels generated by two of the second color sensors closest to the third color sensor that generated the third sub-pixel to form at least three pixels, and
wherein a position of each of the third sub-pixels is offset from the corresponding second sub-pixel such that a distance between a first end of an effective sensing area of each third color sensor and a first end of an effective sensing area of a corresponding second color sensor in the linear direction of the image sensor is a second length.

24. The scanner of claim 23, further comprising: a control circuit capable of driving the scan module.

25. The scanner of claim 20, wherein a length of the first color sensor and a length of the second color sensor are the same.

26. A method of scanning an image using a row of N first light color sensors $R_1$ to $R_N$, a row of N second light color sensors $G_1$ to $G_N$, and a row of N third light color sensors $B_1$ to $B_N$, the method comprising:
generating a first pixel $P_i$ by combining outputs of first light color sensor $R_i$, second light color sensor $G_{i-1}$, and third light color sensor $B_{i-1}$;
generating a second pixel $P_{i+1}$ by combining outputs of first light color sensor $R_i$, second light color sensor $G_i$, and third light color sensor $B_{i-1}$; and
generating a third pixel $P_{i+2}$ by combining outputs of sensors first light color sensor $R_i$, second light color sensor $G_i$, and third light color sensor $B_i$;
wherein the row of N second light color sensors is offset from the row of N first light color sensors in a transverse direction perpendicular to a scan direction such that the second light color sensor G1 overlaps the first light color sensor R2; and
wherein the row of N third light color sensors is offset from the row of N second light color sensors in the transverse direction such that the third light color sensor G1 overlaps the first light color sensor R2 and the second light color sensor G2.

27. The method of claim 26, wherein the N first light color sensors are configured to sense red light, the N second light color sensors are configured to sense green light, and the N third light color sensors are configured to sense blue light.

* * * * *

UNITED STATES PATENT AND TRADEMARK OFFICE
CERTIFICATE OF CORRECTION

PATENT NO. : 7,511,866 B2  Page 1 of 1
APPLICATION NO. : 10/905844
DATED : March 31, 2009
INVENTOR(S) : Chang-Yung Feng It is certified that error appears in the above-identified patent and that said Letters Patent is hereby corrected as shown below:

Title Page
*Primary Examiner*, change "Twyler L" to --Twyler L.--

Column 7
Line 42, change "sub pixels" to --sub-pixels--

Column 8
Line 57, insert --sensing area-- after "effective"

Column 9
Line 8, change "second" to --third--

Column 10
Line 4, change "sub-pixels" to --color sensors--
Line 5, change "sub-pixel" to --color sensor--
Line 18, remove "is combinable"
Line 25, change "sub-pixels" to --color sensors--
Line 26, change "sub-pixel" to --color sensor--
Lines 47-48, change "of sensors first" to --of first--

Signed and Sealed this

Twentieth Day of July, 2010

David J. Kappos
*Director of the United States Patent and Trademark Office*